July 10, 1923.
J. T. CORLEY
BRACKET
Filed Sept. 25, 1922
1,461,210
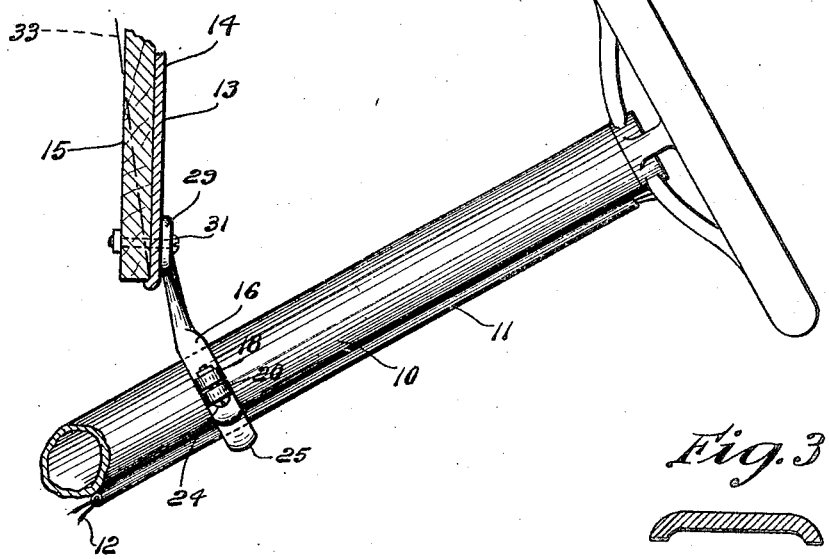
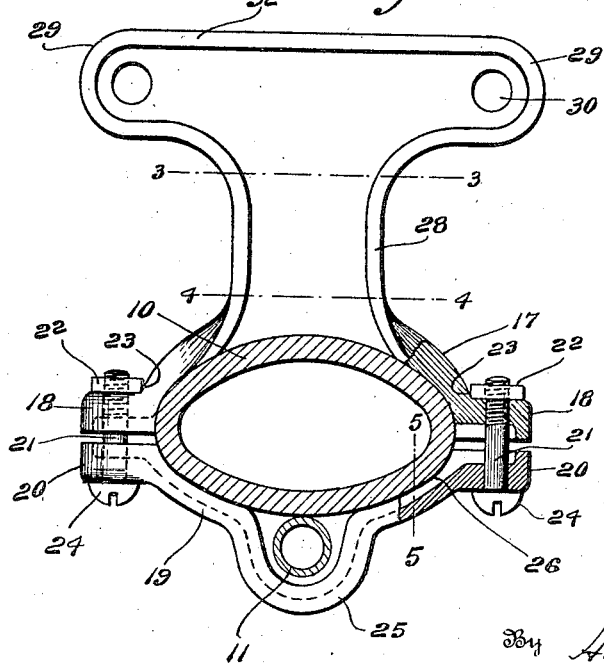
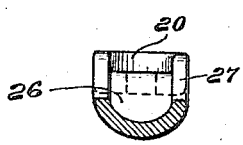
Inventor
John T. Corley
By Howard E. Barlow
Attorney Patented July 10, 1923.

1,461,210

UNITED STATES PATENT OFFICE.

JOHN T. CORLEY, OF PROVIDENCE, RHODE ISLAND.

BRACKET.

Application filed September 25, 1922. Serial No. 590,335.

*To all whom it may concern:*

Be it known that I, JOHN T. CORLEY, a citizen of the United States, residing at Providence, in the county of Providence and State of Rhode Island, have invented certain new and useful Improvements in Brackets, of which the following is a specification.

This invention relates to an improved construction of bracket for embracing and supporting the steering column of a motor vehicle, and the object of this invention is to so construct such a bracket that the same may be readily applied to the steering column of the vehicle and have its attaching flange portion so constructed that it may be bent or twisted relative to the embracing yoke portion, to conform to the varying angles and planes of the dash boards of different vehicles to which it is to be attached.

With these and other objects in view, the invention consists of certain novel features of construction, as will be more fully described, and particularly pointed out in the appended claims.

In the accompanying drawings:

Figure 1 is a side elevation showing a portion of a steering post and my improved bracket as embracing the post and connecting it to the dash-board of a vehicle.

Figure 2 is a view of the under side of the bracket partly in section showing the same as embracing a steering post which latter is shown in section.

Figure 3 is a section on line 3—3 of Figure 2 showing the edges of the neck portion as being slightly rolled over or turned back forming a shallow groove at this end.

Figure 4 is a section on line 4—4 of Figure 2 showing the side edges of the neck portion as rolled back forming a deeper groove on the under side of this portion of the neck.

Figure 5 is a section on line 5—5 of Figure 2 showing the cap portion of the yoke as grooved longitudinally to reduce its bearing surface and facilitate its being fitted to the column.

With reference to the drawings, 10 designates the usual steering post of a certain type of motor vehicle, along the under side of which is run a tube 11 carrying the lighting or horn-operating wires 12.

This class of vehicles is provided with a downwardly extending dash-board 13 which is constructed of an outer face of metal 14 and in some cases with an inner backing board 15 of wood, and it is found in many instances desirable to connect this steering post to this dash-board for the purpose of supporting the post against vibration, and to accomplish this in a simple and practical way, I have provided a bracket or brace 16 which has a yoke portion 17 shaped to embrace and fit the upper side of the steering post and is provided with a pair of laterally-extending attaching ears 18.

I have also provided a removable cap 19 for this yoke, which is also provided with laterally-extending ears 20 corresponding to the ears 18 on the yoke portion and through both of which ears are formed holes for receiving the binding bolts 21 by which the yoke is caused to grip and bind the surface of the steering post.

The nut members 22 of these binding bolts are preferably square and are caused each to fit against a shoulder 23 on the yoke to prevent their turning and becoming loose by the jarring of the vehicle. The head 24 of the bolt is slotted to be screwed into the nut 22.

This cap 19 is provided with an offset loop portion 25 about midway its ears, to permit the wire-carrying tube 11 to extend therethrough, and the inner face of this cap is grooved longitudinally as at 26 to reduce the finished bearing surfaces 27 of this cap and facilitate fitting the same to properly bear against the under side of the post 10.

The yoke portion is provided with a relatively short neck member 28, on the outer end of which are formed laterally-extending flanges 29 provided with holes 30 to receive the attaching bolts 31, the flange being of a length to cause the securing bolts 31 to straddle the steering post, whereby these bolts may be operated upon by a screw driver without being interfered with by the steering post.

By my improved construction, it will be noted that the flanges 29 are grooved on the middle portion of their under surfaces so as to provide a raised bearing edge 32 around the periphery thereof, thereby facilitating the finishing operation. The groove at the neck portion adjacent the flange, is left very shallow, as illustrated in Figure 3, which is a section at this point, by which construction the flange portion may be twisted or bent relative to the yoke portion so as to conform to the varying planes and angles of the various vehicles to which this bracket is applied, the dash in some vehicles being vertical while those in others being set at an angle as indicated by the dot-dash line 33 in Figure 1, and in order to stiffen this bracket at the point where it joins the yoke portion, I have turned the side edges rearwardly more deeply, as illustrated in Figure 4, which shows a section on line 4—4 of Figure 2.

By my improved construction of steering column supporting bracket the same may be readily applied to the steering column and then bent by use of a wrench or other tool to exactly the plane of the surface to which the flange is to be attached, which surfaces very considerably in the different vehicles to which my bracket is adapted to be applied.

This bracket is extremely simple, and practical in construction and effective in its operation and by its use the steering column of a motor vehicle is supported against vibration.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A bracket formed of bendable metal having a yoke portion adapted to embrace the steering column of a motor vehicle, a cap removably secured to said yoke to bind the column therein, a short neck portion on said bracket having laterally-extending fastening flanges on its upper end, said neck portion having its side edges turned back forming a trough in the under side thereof which gradually increases in depth from the flange to said yoke portion whereby said neck portion is adapted to be bent or twisted relative to the yoke portion to conform to the varying planes of the different fastening bases.

2. A bracket formed of bendable metal having a yoke portion adapted to embrace the steering column of a motor vehicle, a cap removably secured to said yoke to bind the column therein and having an offset tube receiving loop, said yoke having a short neck portion with laterally-extending fastening flanges on its upper end and the side edges of said neck being turned back to form a trough in its under side which gradually increases in depth from the flange to the yoke portion whereby said neck portion is adapted to be bent and twisted relative to the yoke portion to conform to the varying planes of the different bases to which the device is to be fastened.

In testimony whereof I affix my signature.

JOHN T. CORLEY.